Sept. 9, 1958  J. P. SCANLAN ET AL  2,851,354
PROCESS OF FORMING SINTERED SHEETS HAVING
COPPER INFILTRATED PORTIONS
Filed Jan. 13, 1954
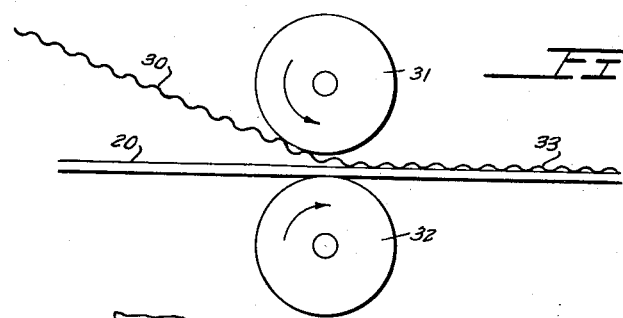
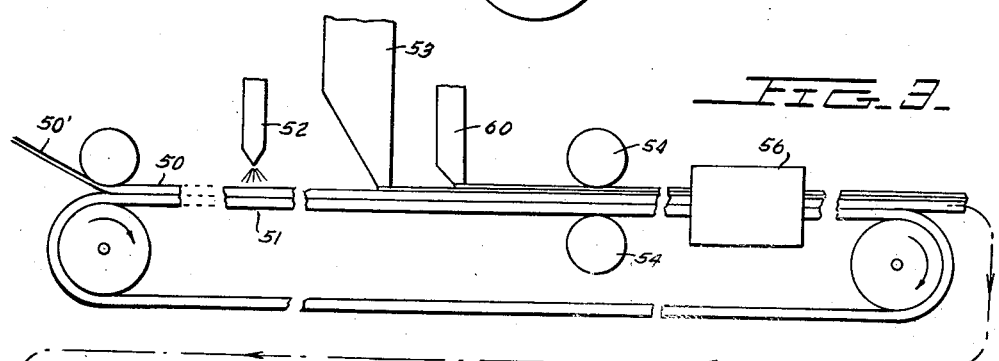
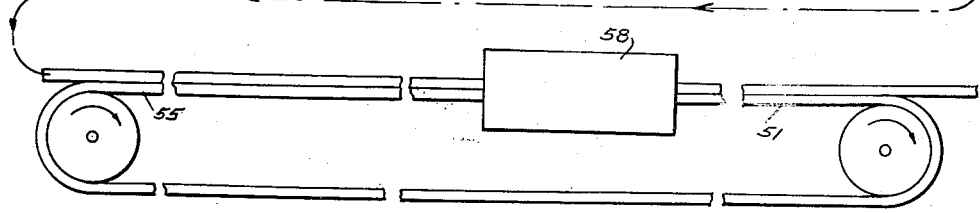
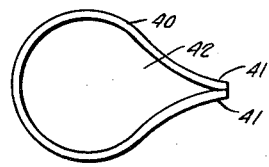
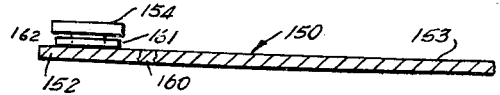
INVENTORS
J. P. SCANLON
L. ALTER
BY
Greene, Pinelas & Durr
ATTORNEYS

United States Patent Office 2,851,354
Patented Sept. 9, 1958

2,851,354

PROCESS OF FORMING SINTERED SHEETS HAVING COPPER INFILTRATED PORTIONS

Joseph P. Scanlan, Yonkers, and Louis Alter, Bronx, N. Y., assignors to Schwarzkopf Development Corporation, a corporation of Maryland Application January 13, 1954, Serial No. 403,794

4 Claims. (Cl. 75—222)

This invention relates to a process of making porous metal strips which are ductile and to the strips so produced.

Among the objects of the invention is to provide porous metal strip material which is flexible and ductile, and which can be bent or curved to any desired shape and welded to itself or to other metal parts.

Among other objects of the invention is to provide a method of making porous metal strips which are ductile.

This invention is based on the discovery that sintered metal bodies of great ductility and porosity as well as great strength can be obtained from bodies of the same shape formed from metal powders which contain a thermosetting resin. In spite of the fact that individual metal particles are first coated all over with thermosetting resin in the "B" state, for example, and even when no substantial pressure is employed to compact the coated metal powders, the process of first setting the resin and subsequently sintering the metal, thereby decomposing the resin, results in a porous body or sheet in which the said metal particles are bonded to each other so well that thin sheets of the material can be bent 90–130° or more without cracking, and if rolled and annealed, can be bent as much as 160° without cracking. The metal particles which are coated with thermosetting resin are first packed to shape (of a thin sheet, for example) and heat treated to cure and set the resin. Thereafter, the sheet is treated at the sintering temperature in a reducing atmosphere, whereupon the thermosetting resin is decomposed and metal to metal bonds replace the metal to resin bonds.

As the metal powders, any desired metal powder ordinarily employed in powder metallurgy may be employed. The process is very advantageous when making articles from powders of stainless steels, nickel, and nickel alloys, and similar ferrous alloys.

The thermosetting resins may be the phenol aldehyde resins such as phenol formaldehyde condensation products, phenol furfural condensation products, the urea aldehyde resins such as the urea formaldehyde condensation products, and melamine resins. Other thermosetting resins, e. g. of the silicone, epoxy or polyester types, may be used. Thermoplastic polymers are unsuitable. Reinforcing perforated metal sheets or wire mesh fabrics may be incorporated into the products during this manufacture.

The porosity may be controlled by the size and size distribution of the metal particles and to a lesser degree by the amount of resin and the amount of pressure employed. After setting of the resin, the unsintered product can be readily handled. After sintering, the sheet may be rolled or otherwise worked and annealed in such a way to reduce or change the shape of the pores. The pores obtained in the product are interconnected as is shown by the fact that liquids or gases may be forced through the sheets. One of the unexpected results obtained is that the presence of thermosetting resin during the early stages of sintering, minimizes the shrinkage of the products during sintering so that a sheet of substantially the same size and shape as the resin-bonded sheet is obtained.

Another phase of the invention is based on the discovery that controlled infiltration to a portion of the sheet may be obtained by incorporating a line of particles which include silver powder into the sheet. The silver containing line forms a barrier region or plane to the passage of infiltrating copper, for example, so that the porous sheet on either side of the line or region can be infiltrated without any of the infiltrating metal passing to the opposite side of the line.

The foregoing and other objects of the invention will be best understood from the following description of exemplifications of the same when read in connection with the accompanying drawing in which:

Fig. 1 is a diagrammatic cross-sectional view of one form of mold suitable for molding a sheet exemplifying the invention;

Fig. 2 illustrates the general character of an equipment suitable for incorporating a reinforcing material into the molded sheet;

Fig. 3 illustrates a way for producing a continuous sheet of the reinforced porous product;

Figs. 4 and 5 illustrate how the sheet may be employed to form desired three-dimensional coated or hollow products; and Fig. 6 is a view illustrating the process of infiltrating one predetermined region of the sheet.

Briefly, the process of the invention comprises the steps of coating the metal particles with a thermosetting resin, compacting or pressing (if desired) the coated powders to sheet form, treating the formed sheet to cure the resin, sintering the resultant resin-bonded product so that the resin is decomposed and thus eliminated and so that metal to metal bonds between the particles are established. Fig. 1 shows a typical mold for pressing the powder to the shape of the sheet desired. The mold 10 comprises a cavity 11 of simple form, and it is obvious that other cavities of more complex shape may be used. However, since the sheet produced can be bent and twisted to any desired shape, it is seldom that any complicated shaping mold cavity is called for. The pressure applied is not critical and may be any amount from the small amount of pressure sufficient to level the powder charge up to about 2 p. s. i. (pounds per square inch) or more. Compacting can also be performed by vibrating. Where no substantial pressure is used to form the sheet, the thermosetting resin is cured while the powder is still in the mold to produce the green resin-bonded product 20. After this product is sintered, no substantial shrinkage takes place and it has substantially the identical shape of the sheet 20, although after sintering, it takes on a metallic luster.

After sintering, the cemented metal sheet product may be rolled whereupon it takes the luster of a polished sheet, but retains most of its porosity especially when rolled between rollers of large diameter. In the rolled or unrolled state, the sheet product is ductile and can be hammered, twisted or bent to a surprising degree without cracking. This non-rolled porous powder sheet of the invention may be bent over a radius of ½ inch more than about 90° without cracking. When rolled, such sheet may be bent over a radius of ⅛ inch more than about 160° without cracking. The ductility of the rolled sheet is improved further by annealing.

A reinforcing screen or perforated metal sheet 30 can be rolled into the sintered sheet or can be incorporated with the sheet at the time the sheet is pressed to form in the mold 10 of Fig. 1 or into the resin-bonded sheet. In each case, provision is made that the powder particle material of the sintered sheet fills the openings in the reinforcing screen or perforated sheet. Fig. 2 shows a porous sheet 30 being rolled into a sintered or partially sintered sheet 20 by rollers 31, 32 to produce the combined sheet 23. Where nickel, nickel alloys or stainless steel powders are employed as the powder particles, an excellent bond is obtained between the porous sheet 20 and the reinforcing sheet 30 by previously coating the reinforcing sheet with copper and sintering the combined reinforcing sheet and porous metal product 23.

Fig. 3 shows how a continuous metal sheet may be continuously coated with a ductile porous sintered powder metal coating in accordance with the invention. A continuous thin metal sheet 50 is fed onto belt 51 and while on said belt, a copper coating is sputtered or sprayed at 52 on the metal sheet. Next, a layer of metal particles coated with synthetic resin is deposited as from a depositing equipment at 53 and the so-treated sheet 50 is passed between leveling rollers 54. From the leveling rollers 54 the sheet 50 with the powder layers are moved through a curing oven 56 having heaters, such as infra-red lamps, whereby it is heated to the curing temperature of the resin so that the resin of the deposited metal powder layer is properly cured. Thereafter, either continuously or at a later time, the resin-bonded layer with the sheet 50 is passed, as by another belt 55, through a sintering furnace 58 wherein the powder layer is heated to the sintering temperature in the manner previously described. In this way, long sheets of the porous metal products combined with a continuous metal sheet may be obtained which are suitable for the manufacture of large filtering devices or catalytic chambers for use in chemical processes.

As shown in Fig. 4, sheets 23 of the invention made according to the process described above can be employed for forming hollow porous products such as shown at 40 by winding a sheet section around a form 42 and welding the overlapping edges 41 together. As shown in Fig. 5, such sheet may be also welded along its edges into a tubular body 43 with a disk 44 of the same sheet material welded to the edges of the tubular body 43 to form a porous filter cap. The form 42 may be removed from the hollow body after the welding or after shaping the sheet section and before welding the overlapping sheet edges 41.

Where it is desired to make one portion of a sheet non-porous by infiltration without closing the pores in another portion of the sheet, a line of powder which includes silver particles is incorporated into the sheet as by the hopper 60 which is of approximately the width of the line desired. The amount of silver in the powder which is to form the barrier line (160 in Fig. 6) will depend on the sintering temperature etc. Generally, 2–10% or more of the silver particles are satisfactory, but if desired, the entire lined portion may consist of silver particles. The product which includes the silver particles is treated in substantially the same way as without the silver addition. If it is desired to infiltrate the portion 152 of the product 150 of Fig. 6, for example, copper plates 154 are placed on the portion 152 and the product is heat-treated to cause infiltration of the copper. Between copper plates 154 and the sheet 150 iron supports 161, 162 are placed so that the molten copper dissolves iron up to the saturation point before coming into contact with the sheet 150. The copper infiltration can be performed after sintering or simultaneously with sintering. The barrier line 160 containing the silver prevents molten cuprous infiltrant from flowing from the infiltrated region 152 into the region 153 which is to remain porous.

The following examples show exactly how various types of sheets of the invention are made according to the process of the invention.

*Example 1*

Stainless steel powder —325 mesh is continuously stirred while 1–1½% of phenol formaldehyde resin in the acetone soluble or "B" state, dissolved in acetone is incorporated into the stainless steel powder. As the acetone evaporates from the powder, agglomerates are formed, but the stirring is continued until substantially all the acetone has evaporated. The powder is then sifted to remove agglomerates. The thus coated powder is introduced into a mold as shown in Fig. 1 and formed into a flat sheet which is approximately 3/16" to 1/4" thick. While still in the mold, the sheet is introduced into an oven at 450° F. for approximately 30 minutes to produce a resin-bonded product.

The resin-bonded product is then put into a metal boat provided with activated ferrochrome as a getter and introduced into a sintering temperature. During sintering, the body is heated to approximately 2400° F. for 1½ hours while hydrogen or cracked ammonia is passed through the gettered boat. A flat slab of cemented metal having a metallic luster results which can be bent 130° without cracking.

*Example 2*

The process is conducted as in Example 1, except that a perforated stainless steel sheet which has been coated with copper by sputtering is introduced into mold 10 before introducing the powder, and the resulting product contains said perforated stainless steel sheet intimately bonded to the powder particles. The porosity of various parts of the final product can be controlled by varying the number and/or size of orifices in various parts of the reinforcing sheet.

*Example 3*

The process is conducted as in Example 1, except that prior to the final sintering process, a copper coated screen is rolled into the resin-bonded sheet.

*Example 4*

The process is conducted as in Example 1, except that the resin-bonded product is presintered for only ¾ hour and thereafter a screen is rolled into the sheet, whereupon the final sintering is carried out at 2400° F. for 1½ hours.

*Example 5*

The process is conducted as in Example 1, except that urea formaldehyde or melamine resin is substituted for phenol formaldehyde resin.

*Example 6*

The product obtained in Examples 1–5 is rolled between rollers one or more times to reduce the thickness approximately .0015" per pass, for example, and provide a smooth surfaced porous sheet.

*Example 7*

The process is conducted as in Examples 1–6, except that nickel powder particles are employed in place of stainless steel.

The products produced by all of the above examples are porous sheets which are bendable, ductile, weldable and still porous. The porosity can be varied to form 5 to 10% up to 55%. With Example 1, the porosity is approximately 45%.

*Example 8*

The process is conducted as in Example 1, except that a thin line along the sheet contains 10% of incorporated silver particles. The resultant product is infiltrated with copper by placing a copper disk on one side of the line, as 160 of Fig. 6, and heating to around 1950° F. The resultant product will be non-porous in the copper infiltrated area, but porous in the area opposite the line containing the silver particles.

Very desirable products are obtained in each of the foregoing examples. The invention is of great practical importance in forming porous metal products out of stainless steel powder, and in general, out of stainless metal alloy powder which will not corrode at high temperatures in oxidizing gases.

The features and principles underlying the invention described above in connection with specific exemplifications, will suggest to those skilled in the art many other modifications thereof. It is accordingly desired that the appended claims shall not be limited to any specific features or details shown or described in connection with exemplifications thereof.

We claim:

1. The process of forming a sheet of sintered ferrous particles having a porous region and a further region the pores of which are infiltrated by a copper infiltrant, which process comprises the steps of coating ferrous metal particles with a thermosetting resin which is soluble in a volatilizable solvent, depositing the so-coated ferrous particles on a continuous support surface for forming out of the coated particles a continuous ferrous sheet, and while so depositing the coated ferrous particles on such support surface, depositing on an intermediate narrow region of said support surface ferrous particles containing above about 2% silver admixed therewith for providing a narrow silver-containing barrier region separating one sheet region of the deposited ferrous sheet from a further sheet region of the deposited ferrous sheet, heat-treating the so-deposited ferrous sheet to cure its resin content and produce a resin-bonded ferrous sheet, further heat-treating the resin-bonded ferrous sheet to decompose and drive off the resin content and to sinter its ferrous particles into a continuous ferrous sheet having interconnected pores, thereafter subjecting the sintered ferrous sheet to further sintering while providing a molten cuprous infiltrant for infiltration into the pores of said further ferrous sheet region extending on one side of the silver-containing barrier region so that the silver content of said barrier region shall prevent the molten infiltrant from infiltrating past said barrier region into the pores of said one ferrous sheet region.

2. The process as claimed in claim 1, wherein the ferrous particles consist of stainless steel.

3. The process as claimed in claim 1, wherein the ferrous particles deposited in the narrow barrier region have admixed thereto 2% to 10% silver.

4. The process as claimed in claim 3, wherein the ferrous particles consist of stainless steel.

References Cited in the file of this patent

UNITED STATES PATENTS

| | | |
|---|---|---|
| 2,122,053 | Burkhardt | June 28, 1938 |
| 2,134,366 | Hardy | Oct. 25, 1938 |
| 2,190,237 | Koehring | Feb. 13, 1940 |
| 2,219,423 | Kurtz | Oct. 29, 1940 |
| 2,241,095 | Marvin | May 6, 1941 |
| 2,267,918 | Hildabolt | Dec. 30, 1941 |
| 2,332,746 | Olt | Oct. 26, 1943 |
| 2,337,588 | Calkins | Dec. 28, 1943 |
| 2,341,732 | Marvin | Feb. 15, 1944 |
| 2,373,405 | Lowit | Apr. 10, 1945 |
| 2,386,544 | Crowley | Oct. 9, 1945 |
| 2,402,120 | Boegehold | June 18, 1946 |
| 2,471,630 | Kurtz | May 31, 1949 |
| 2,553,714 | Lucas | May 22, 1951 |
| 2,593,943 | Wainer | Apr. 22, 1952 |
| 2,606,831 | Koehring | Aug. 12, 1952 |
| 2,630,623 | Chisolm | Mar. 10, 1953 |